United States Patent Office 2,914,790
Patented Dec. 1, 1959

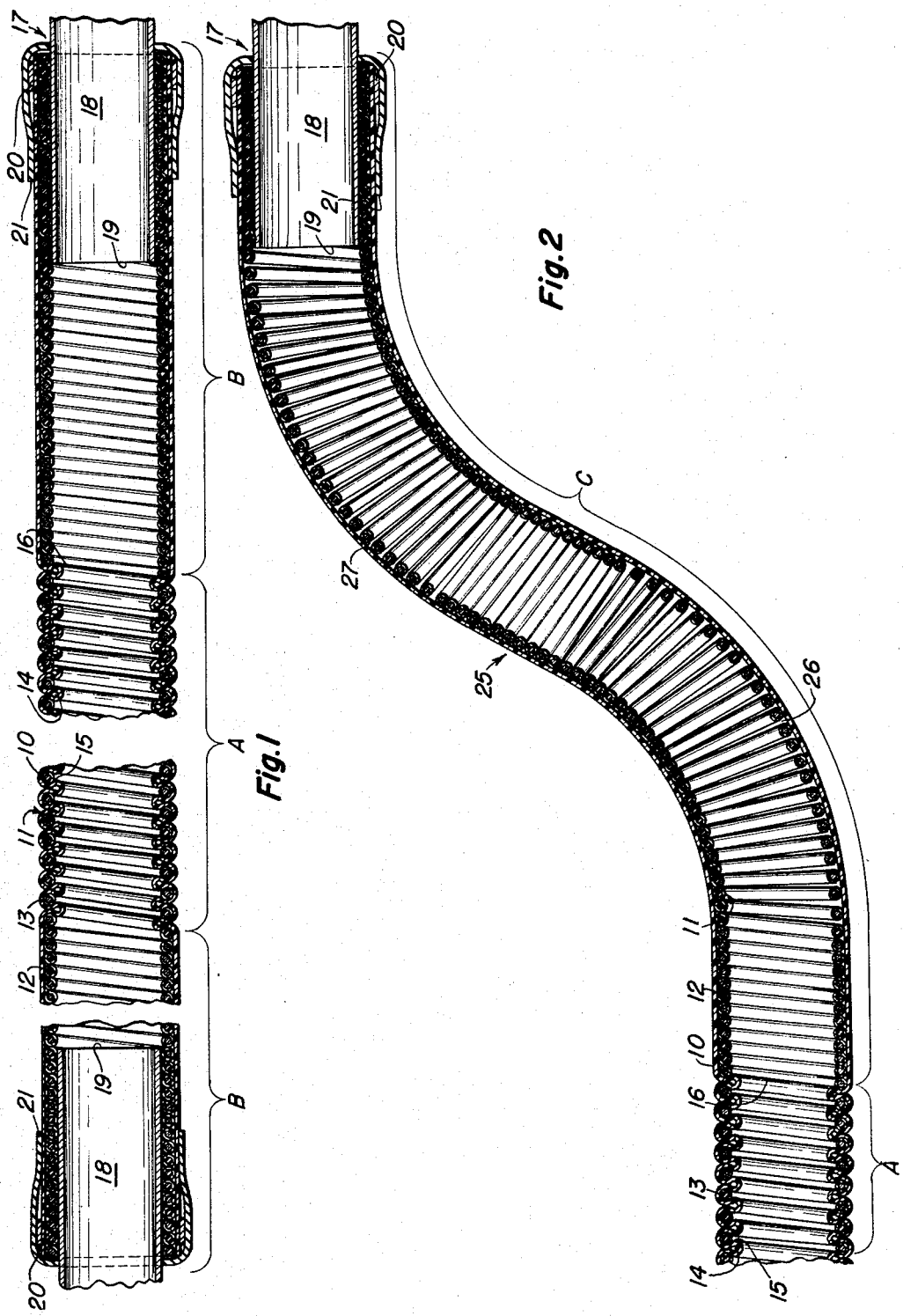

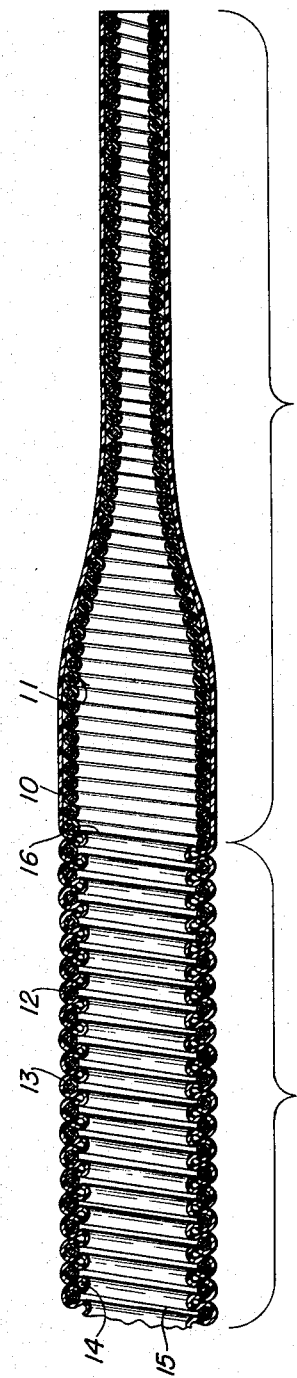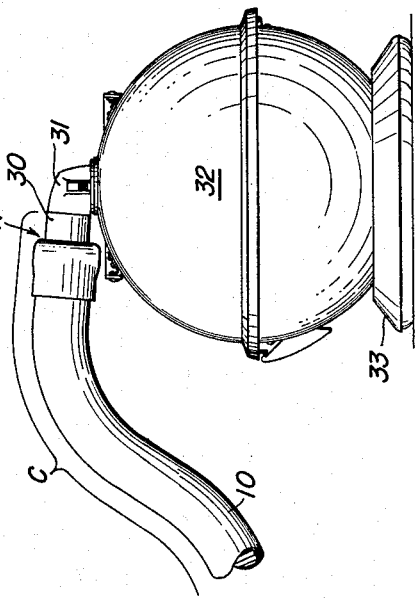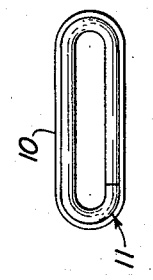

2,914,790

SUCTION CLEANER AND FLEXIBLE AND EXTENSIBLE HOSE THEREFOR

Kenneth R. Warburton, Columbus, Ohio, assignor to The Hoover Company, North Canton, Ohio, a corporation of Ohio Application December 17, 1954, Serial No. 475,868

4 Claims. (Cl. 15—327)

The present invention relates to flexible hose and more particularly to a flexible hose for use with suction cleaners which is also extensible in use to from two to four times its normal unstretched length.

The present invention is an improvement over an application by Jack E. Duff, Serial No. 415,256, filed March 10, 1954, now Patent No. 2,739,616, dated March 27, 1956.

That application discloses a flexible and extensible hose formed of a cylindrically coiled reinforcing element and a thermoplastic covering with the turns of the reinforcing element lying in an interiorly facing deep spiral fold in the tube wall and with a deep outwardly facing spiral fold lying between adjacent turns of the coil and with the coil stressed so that the turns tend to come into contact with each other when free to do so.

The hose of the Duff application is formed by coiling the cylindrical spiral reinforcing element in such a manner that the turns thereof will be in contact with each other when free to do so. The coil is then placed on an arbor or mandrel and stretched to from two to four times its free unstretched length. A thermoplastic tube having an inside diameter less than that of the stretched coil and of the same length is blown over the stretched coil and deflated so that the wall of the tube will closely embrace the turns of the coil and tend to enter the space between the adjacent turns of the coil. The coil is then released and the turns thereof will move toward each other as far as permitted by the wall of the tube. The inside diameter of the tube being less than that of the coil, the wall of the tube will move inwardly between adjacent turns of the coil. The carcass thus formed is then heated to about 160° F. which relieves the stresses in the tube wall permitting the turns of the coil to again move toward each other until adjacent turns are separated only by the two thicknesses of a deep spiral fold in the tube wall lying in closed loose loops between the turns of the coil and extending inwardly of the diameter of the coil. The carcass is then permitted to cool to room temperature and the tube will take a permanent set in its deeply corrugated condition.

In applying the necessary metallic fittings to the ends of the Duff hose it is necessary to provide some sort of a strain relief to the hose to prevent the hose from being flexed too abruptly about the ends of the metallic fittings. Usually a semi-flexible sleeve is placed about the hose at those points.

According to the present invention the necessity of a separate strain relief is eliminated and the strain relief is built into the hose wall itself. That is done by so building the hose that the turns of the coiled reinforcing element are in close contact with each other at the end whereby the completed hose is relatively stiffer at those points. If desired, the turns of the coil in contact with each other may be bonded to the tube wall to thus positively hold them in contact with each other.

During the formation of the hose of the present invention the end turns of the coil are held in contact with each other as the tube is blown over the coil. After the tube is deflated its wall will contract and hold the end turns in their contacting position. The hose may then be completed as explained in the aforementioned Duff application. If bonding is desired a solvent may be applied to the end turns of the coil whereby they will be bonded to the tube wall during the heating and cooling steps.

According to another form of the present invention the built-in strain release is formed into a "gooseneck" form whereby a separate fitting of that shape is unnecessary when the hose is used with certain types of canister cleaners.

According to another form of the present invention the built-in strain relief is so formed as to constitute a cleaning tool, for example, a crevice tool sometimes attached to the end of a flexible hose for cleaning purposes.

Thus according to the broadest aspects of the present invention, a hose is formed having an ultra-flexible section and at least one section which is relatively stiffer or less flexible than the ultra-flexible section, the latter extending over the greater portion of the length of the hose so as to render the completed hose both flexible and extensible.

Other objects and advantages of the present invention will become apparent as the description proceeds when taken in connection with the accompanying drawings in which:

Fig. 1 is a cross-sectional view of a hose according to the present invention showing how a metallic fitting may be attached thereto, Fig. 2 is a similar view of the hose according to the invention showing the built-in strain relief in the form of a curve or "gooseneck" for use with a suction cleaner of the general type schematically shown in Fig. 3, Fig. 3 is a schematic showing of a suction cleaner of the canister type showing how the hose of Fig. 2 is utilized therewith, Fig. 4 is a view similar to Fig. 1 showing the built-in strain relief shaped to form a crevice tool and Fig. 5 is a view looking at the end of the hose of Fig. 4.

The hose of Fig. 1 comprises a central section A and end sections B. The central section A of each of the hose of the present invention is made according to the aforementioned Duff application and comprise a thin flexible tube 10 which may be polyvinyl chloride or some other elastomeric thermoplastic material having similar properties and a cylindrically spiralled reinforcing element 11. The element 11 is preferably formed of a coiled steel spring wire 12 sheathed in a coating or covering of thermoplastic material 13 preferably of the same material as that of the tube 10.

The individual turns of the element 11 at central section A are prestressed so as to tend to move into contact with each other when free to do so. As shown, they are separated only by a deep spiral outwardly facing fold 14 in the wall of the tube 10 forming closed loose loops between the turns of the coil 11 and extending inwardly of the diameter of the coil, the element 11 lying in an inwardly facing spiral fold 15 in the tube wall.

At sections B the individual turns of the reinforcing element 11 are prestressed and actually do lie in contact with each other as shown. At sections B the individual turns of the coil 11 may, if desired, be bonded to each other and also to the wall of the tube 11.

It has been found in practice that the section A is very flexible and extensible whereas the section B, while capable of being flexed, is relatively stiffer than section A. If the turns of the reinforcing element 11 are bonded to each other and to the wall of the tube 10 the sections B while still being flexible, can be made comparatively more rigid than if the bonding is not employed.

Bonding may or may not be used depending upon the characteristics desired of sections B.

In making the hose of Fig. 1 the wire 12 may be formed into a cylindrical spiral and the covering 13 thereafter applied in any manner known in the art, or covering 13 may be applied by extrusion or otherwise before the element 11 is coiled. In any event, the reinforcing element 11 is prestressed so that the individual turns thereof will lie in contact with each other preferably under a stress holding the turns in their closely wound position.

The coated cylindrical coil 11 is then placed on a mandrel or arbor and the central section A stretched to from two to four times its normal length while the element 11 at the end sections are held in contact with each other. That may be done by fixing the turn 16 which lies between sections A and B to the mandrel or arbor, stretching the central section A to the desired length, fixing a turn at the other end of section A to the arbor while permitting the turns beyond that turn to lie against each other.

The tube 10 which has a normal inside diameter less than that of the coil 11 is then inflated and assembled over the coil 11 in its extended position with the central section A stretched and the end sections B unstretched. The tube 10 is then deflated and its walls will contact about the turns of coil 11 and hold the turns at section A in their stretched condition and the turns at section B in their position in contact with each other.

The ends of coil 11 may then be released and the turns thereof in section A will contract and move toward each other to the extent permitted by the wall of the tube 10 which will cause the wall of the tube 10 to move inwardly between the turns of the coil 11 to an extent permitted by the turns of the coil 11. The turns of the coil 11 at sections B will remain in their original close contact position with the wall of tube 10 closely embracing it and being substantially cylindrical and free of corrugations.

The carcass is then removed from the mandrel or arbor and heated to a temperature of 160° F. or less which relieves the stresses in the tube 10 and permits the turns of the coil at section A to move toward each other to the maximum extent possible as shown, being separated only by the walls of the fold 14 which lie between the adjacent turns of the coil 11 and forming deep closed loose loops extending inwardly beyond the diameter of the coil 11.

The heat may be applied by immersing the carcass in warm water.

If it is desired that the turns at section B be bonded to each other and to the tube 10, a solvent may be applied to the turns of the end section B before the tube 10 is assembled over the extended coil 11.

The carcass is then permitted to cool to room temperature and the tube will take a permanent set in the position shown in Fig. 1 with the turns at the end section B in contact with each other and bonded to the wall 10, if a solvent was used, and with the turns of coil 11 at section A being extensible so that section A may be stretched to from two to four times its unstretched length. When the central section A is flexed the fold 14 on the outside of the flex will merely flatten out while the turns on the inside will remain in their original position unless the hose should be stretched as it is flexed.

The end section B will be comparatively less flexible than the section A and constitutes a strain relief built into the wall of the hose itself and eliminates the necessity of providing a separate strain relief.

After the hose with the built-in strain relief of Fig. 1 is completed it is necessary that fittings be attached to its ends and the strain relief sections B contribute admirably to that end. One suitable fitting is generally indicated by the reference numeral 17. It comprises a metallic nipple 18 having one end 19 snugly fitting within the ends of section B in contact with the inner peripheries of the end turns of coil 11, a clamping band 20 and an appearance covering 21 over the clamping band. The free end of nipple 18 may be formed to mate with a complemental fitting on a suction cleaner or a suction cleaning tool.

Since the turns of coil 11 at sections B are held in contact with each other by the wall of the tube 11 the hose will flex about the inner end of the nipple 18, the wall of the tube being stretched on the outside of the curve during such flexing action. It will thus be obvious that the section B will be less flexible than section A and that no abrupt flexing will take place between the two sections A and B, which is a distinct advantage since the turns of the coil 11 at section A are liable to be displaced from one corrugation to an adjacent one if the hose is flexed too abruptly about the end of an interior rigid member such as the nipple 18.

The reinforcing wire is preferably made of steel 0.058" in diameter and the sheath or coating is approximately 0.010" in thickness, making the complete diameter of the composite reinforcing element 0.078". The tube 10 is preferably made of polyvinyl chloride having a wall thickness of 0.022" and a tensile strength of 2,000 pounds per square inch at 80° F. The sheath or covering is preferably made of the same material as the tube.

While the diameter of the coil, the diameter and thickness of the tube, the length of the unstretched coil and the length of the tube may vary widely for making hose of different sizes and for different purposes, the following has been found very satisfactory for making suction cleaner hose according to the present invention. The coil 11 may have an inside diameter of 1⅜" and the tube an original inside diameter of 1¼" and a thickness of 0.022". A coil having an unstretched length of 39 to 40 inches may be used with a tube 170 inches long.

By using parts having the foregoing dimensions and the method of the present invention a hose having the following characteristics may be formed. When the carcass is removed from the mandrel it will contact from 170 inches to approximately 100 inches. After it is heat treated it will contract to approximately 77 inches if no compressing force is applied. When a compressing force is applied it will contract to approximately 62 inches. Such a hose, by the application of a 6-pound axial pull can be stretched to 165" or 11¾ feet and when the force is released it will return to a free length of 77 inches and can be returned to a length of 62 inches for storage.

The hose of Fig. 2 is similar to that of Fig. 1 except that one end section C combines the built-in strain relief with a "gooseneck" 25. The hose is made in the same manner as that of Fig. 1 except that before the carcass is heated the section C is bent into the "gooseneck" or curved shape shown and held in that position during the heating and cooling steps and when cooled will take a permanent set in the position shown.

When the section C is bent into the shape shown the turns of coil 11 will be separated at the outside of the curves as shown at 26 and 27 and will remain in contact with each other on the inside of the curves. Thus if a solvent is applied before the tube end is assembled over the coil, the turns of the coil 11 will be bonded to the wall of the tube 10 in the position shown to further assure that the section C will remain in the curved position shown.

The opposite end of the hose of Fig. 2 will have a fitting attached thereto similar to the fitting 17 of Fig. 1. However, the fitting at the end of section C will be formed to interfit with a complemental fitting 30 swivelled at 31 to the suction outlet on the top of a canister type cleaner 32 mounted for sliding movement over a surface by means of a support 33 as shown in Fig. 3

With cleaners of the type shown in Fig. 3 it is necessary that the line of pull on the hose be low so that the cleaner will not tip when pulled across a floor by means of the hose. It has been the practice in the past to provide a separate "gooseneck" fitting of the general shape of section C and to attach the hose to the end of the separate fitting. By the invention of Fig. 2 that separate fitting is unnecessary since the built-in combined strain relief and "gooseneck" serves the same purpose.

The hose of Fig. 2 also has special utility in an arrangement such as shown in Fig. 3 because it is not necessary that the hose be very flexible at the end which is attached to the cleaner body.

The hose of Fig. 4 may be made in the same manner as that of Fig. 1, omitting the fitting 17. After the hose is completed the section D may be placed in a suitable press and its end collapsed into a flattened oval shape as shown in Fig. 5.

The section D may then be used as a crevice tool for suction cleaners without the necessity of a separate attachment for that purpose.

If desired the coil 11 may be flattened before the tube is applied in which case the arbor or mandrel would have to be of a special flattened or oval shape at one end. The opposite end of the hose of Fig. 4 which is not shown would, of course, be provided with a fitting such as that shown at 17 of Fig. 1.

In each modification shown the central section of the hose is highly flexible and extensible with the turns of the reinforcing element lying in a deep spiral fold in the wall of the tube and being separated by another oppositely facing spiral fold in the tube wall while at the end sections the turns of the coil reinforcing element are in contact with and pressing against each other with the wall of the tube being smooth and uncorrugated so that it is necessary to stretch the wall of the tube in order to flex the hose at those points thus making the ends of the hose relatively nonextensible and less flexible than the central section.

While I have shown and described but three modifications of my invention it is to be understood that those modifications are to be taken as illustrative only and not in a limiting sense. I do not wish to be limited to the particular structures shown and described but wish to include all equivalent variations thereof except as limited by the scope of the claims.

I claim:
1. A flexible hose comprising, a highly flexible section and a less flexible curved section, said hose being formed of a spirally coiled reinforcing element having the turns thereof stressed to normally contact each other and a covering tube of an elastomeric thermoplastic material having an original inner periphery less than that of said coiled reinforcing element, the turns of said reinforcing element being in contact with each other on the inside of the curve of said less flexible section and spaced from each other on the outside thereof, said tube contacting and being bonded to only the periphery of the turns of said coils at said less flexible section and said tube at said highly flexible section having inwardly and outwardly facing spiral folds with the turns of said reinforcing element lying within said inwardly facing fold and said outwardly facing spiral fold forming deep closed loose loops extending inwardly of the diameter of the turns of said reinforcing element.

2. A flexible and extensible hose comprising, a spirally coiled reinforcing element sheathed within a covering of thermoplastic material and prestressed so that the juxtaposed turns thereof normally press into contact with each other when free to do so, and an elastomeric thermoplastic tube embracing said coiled reinforcing element and having an original inner periphery less than that of said coiled reinforcing element, the turns of said coiled reinforcing element lying within a spiral fold in the wall of said tube and being separated by deep closed loose loops which extend between the turns of said reinforcing element beyond the diameter thereof and which form an oppositely facing spiral fold in the tube wall over a first portion of the length of said hose and the turns of said coil lying in close contact with each other and being bonded to an uncorrugated length of said tube over a second portion of the length of said hose and said reinforcing element being unbonded to said tube over said first portion.

3. A hose according to claim 2 in which said second portion is of a curved form with the turns of said reinforcing element being in contact with each other on the inside of the curved portion and spaced from each other on the outside thereof and being normally held in its curved position by the bond between the turns of said reinforcing element and said tube.

4. In a suction cleaner, a cleaner body of the canister type having a top suction inlet and a flexible hose attached to said top suction inlet, the arrangement being such that said body may be propelled over a surface by pulling on said hose, said hose being formed of a cylindrical spirally coiled reinforcing element embraced by a thermoplastic tube having an original inside diameter less than that of said coiled reinforcing element and having an ultra-flexible section spaced from said body by a more rigid section, said more rigid section being formed in the shape of a "gooseneck" having its upper end attached to said top suction inlet and its lower end attached to the end of said ultraflexible section, the body of said "gooseneck" extending downwardly along the body of said cleaner to the mid-portion thereof, the turns of said coiled reinforcing element being in contact with each other on the inner side of the curves of said "gooseneck" and spaced from each other on the outside of the curves, the turns of said reinforcing element being bonded to the wall of said tube at said more rigid section so as to hold it in its "gooseneck" shape.

References Cited in the file of this patent
UNITED STATES PATENTS

| | | |
|---|---|---|
| 1,559,804 | Sweeny | Nov. 3, 1925 |
| 2,430,081 | Roberts et al. | Nov. 4, 1947 |
| 2,463,293 | Mentel | Mar. 1, 1947 |
| 2,539,195 | Lang | Jan. 23, 1951 |
| 2,550,576 | Marshall | Apr. 24, 1951 |
| 2,560,369 | Roberts | July 10, 1951 |
| 2,602,278 | Sam | July 8, 1952 |
| 2,630,157 | Smellie | Mar. 3, 1953 |
| 2,641,302 | Martin et al. | June 9, 1953 |
| 2,739,616 | Duff | Mar. 27, 19__ |

UNITED STATES PATENT OFFICE
CERTIFICATE OF CORRECTION

Patent No. 2,914,790 December 1, 1959

Kenneth R. Warburton

It is hereby certified that error appears in the printed specification of the above numbered patent requiring correction and that the said Letters Patent should read as corrected below.

Column 3, line 25, and column 4, line 40, for "contact", each occurrence, read -- contract --; same column 4, line 70, for "fiting" read -- fitting --.

Signed and sealed this 9th day of August 1960.

(SEAL)
Attest:
KARL H. AXLINE
Attesting Officer

ROBERT C. WATSON
Commissioner of Patents